June 4, 1940.   R. F. PEO ET AL   2,202,918
INDEPENDENT WHEEL SUSPENSION
Filed Jan. 20, 1939   3 Sheets-Sheet 1
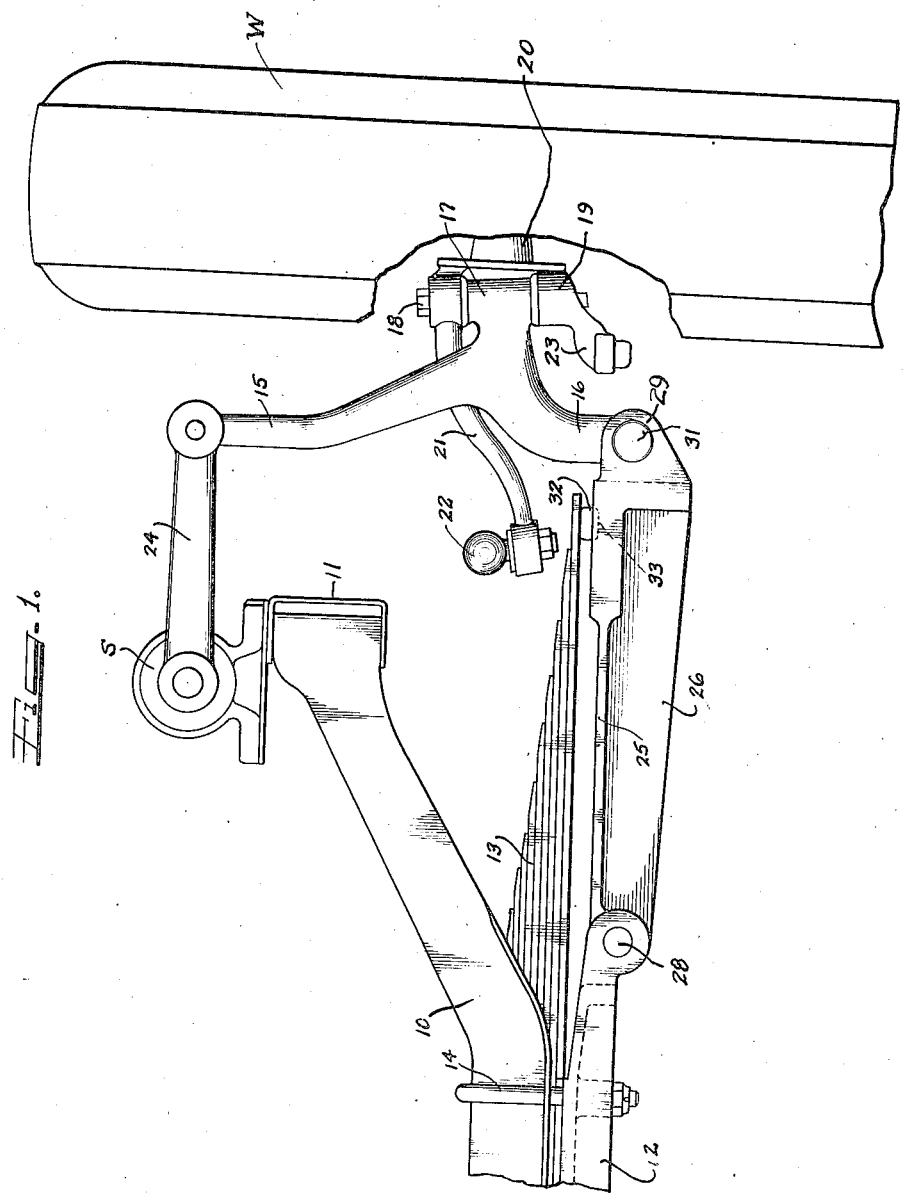

June 4, 1940.    R. F. PEO ET AL    2,202,918
INDEPENDENT WHEEL SUSPENSION
Filed Jan. 20, 1939    3 Sheets-Sheet 2
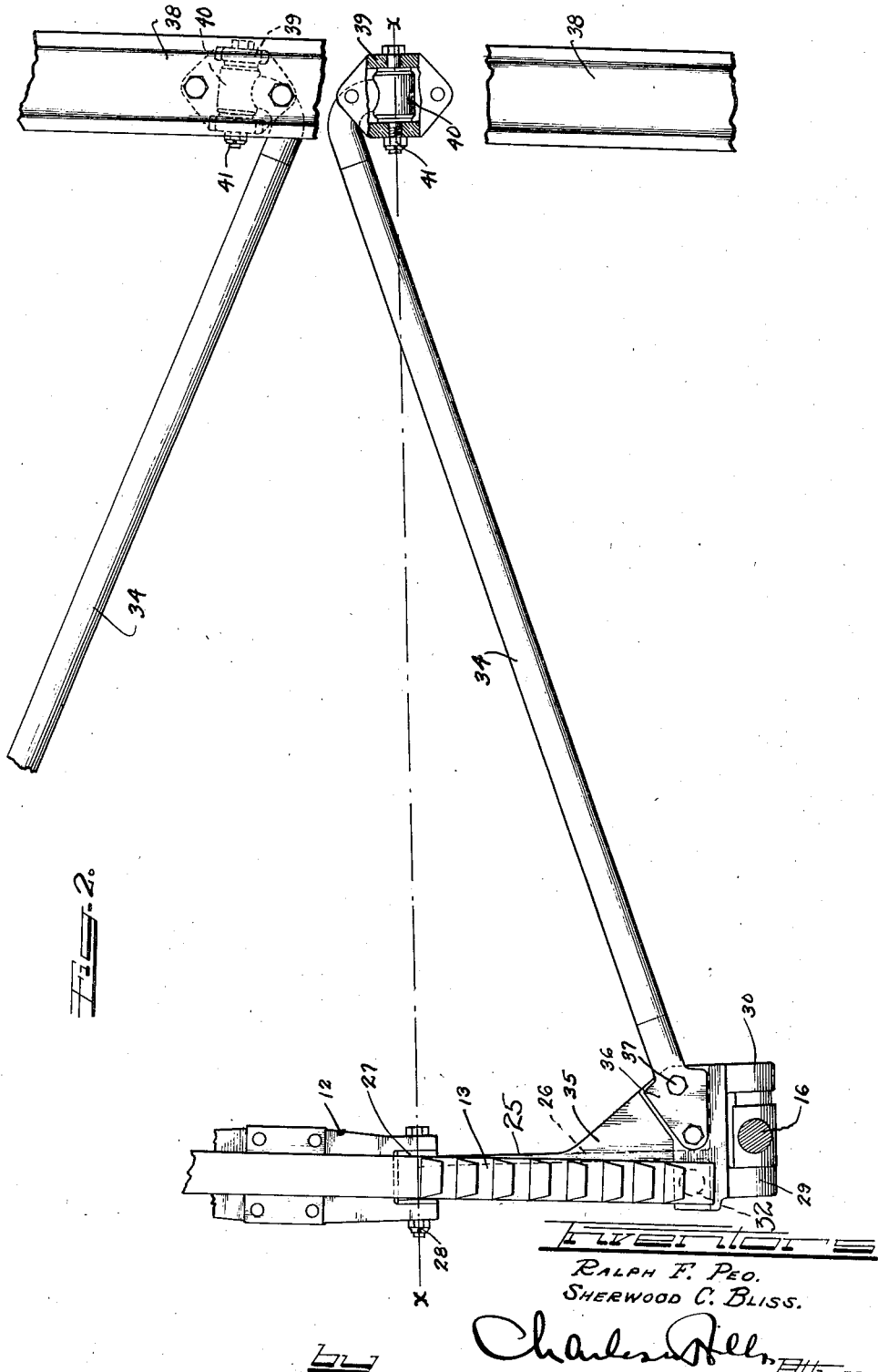

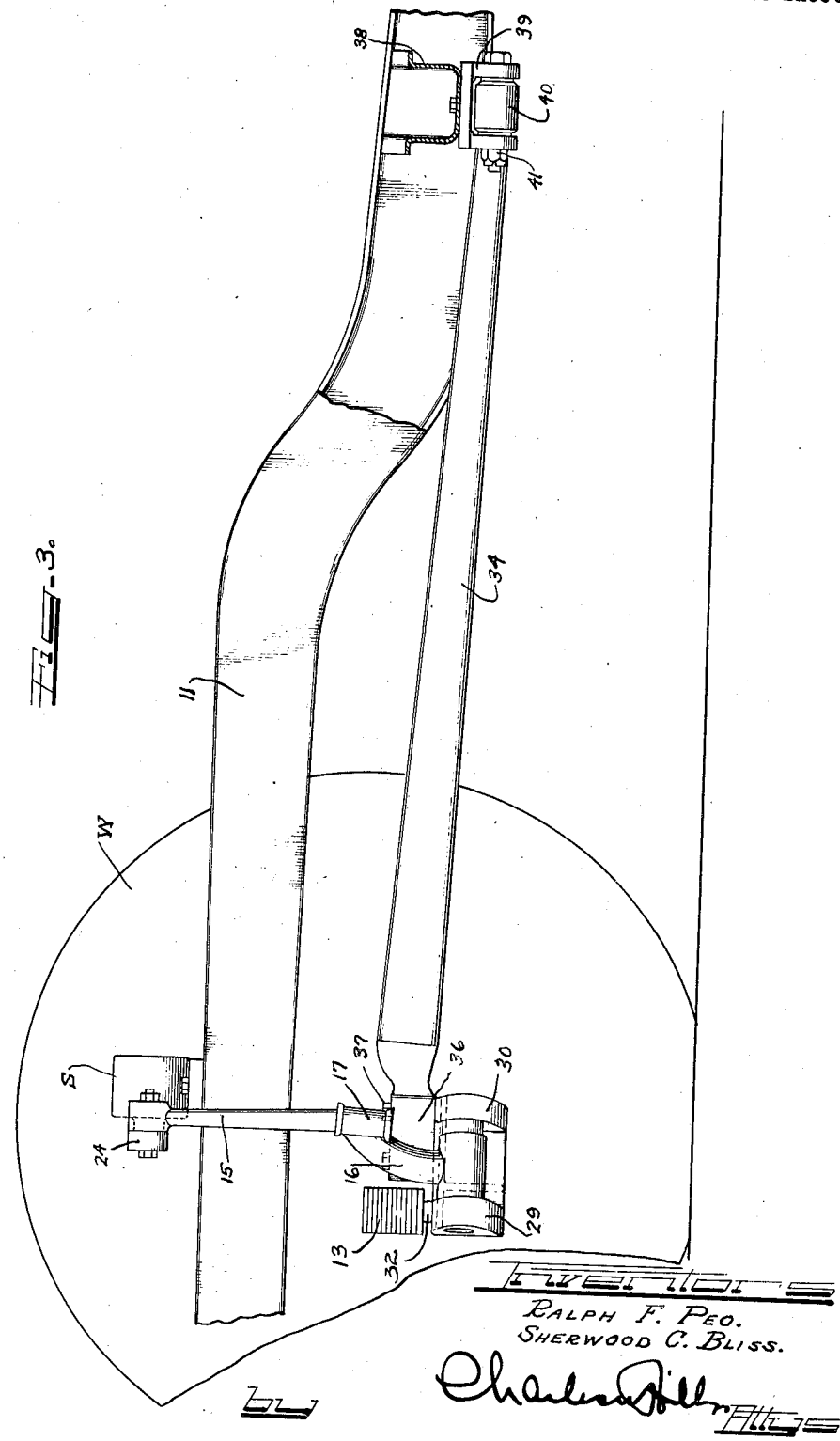

Patented June 4, 1940

2,202,918

UNITED STATES PATENT OFFICE 2,202,918

INDEPENDENT WHEEL SUSPENSION

Ralph F. Peo and Sherwood C. Bliss, Buffalo, N. Y., assignors to Houde Engineering Corporation, Buffalo, N. Y., a corporation of New York Application January 20, 1939, Serial No. 251,902

1 Claim. (Cl. 267—19)

This invention relates to independent wheel suspension for automotive vehicles and particularly to that type of suspension in which a transversely extending cantilever vehicle spring forms the resilient element of the suspension quadrilateral.

An important object of the invention is to eliminate the pivotal connection, by shackle or otherwise, of the end of the cantilever spring with the outer or wheel supporting link of the quadrilateral, and to provide a bearing seat or rest for the outer end of the spring on the lower link of the quadrilateral adjacent to the outer end thereof, with the pivot axis of the lower link in vertical alignment with the spring radius center so as to reduce to a minimum any relative movement between the spring end and the link and thereby eliminate wear, as well as reducing the cost of manufacture.

A further important object of the invention is to provide independent bracing for each suspension quadrilateral for absorbing braking torque and end thrust, the bracing structure being in the form of a radius rod secured at its forward end to the lower link of the quadrilateral and anchored at its rear end to the vehicle chassis, with the center line of the anchorage bearing coincident with the center line of the pivot connection of the lower quadrilateral link with the outer or wheel supporting link so that the brace structure will not in anywise interfere with the free vertical movement of the wheel and the suspension quadrilateral.

The invention also includes other features of construction and arrangement, and the various features of the invention are shown incorporated in the structure disclosed on the drawings, in which drawings:

Figure 1 is a front elevation of one of the front wheels of an automobile and its suspension structure;

Figure 2 is a plan view of the suspension quadrilateral and the brace or radius rod structure and arrangement;

Figure 3 is a side elevation.

Referring to Figure 1, 10 represents the front cross frame extending between the chassis side beams 11 of the vehicle, and between this cross frame and a clamping frame or block 12, the cantilever spring 13 is clamped, as by U-bolts 14.

The outer link of the suspension quadrilateral comprises the upper and lower arms 15 and 16 extending from the knuckle boss 17 which is pivoted by a king bolt 18 to the wheel supporting frame 19, from which extends the axle 20 for the wheel W. The frame 19 has the upper inwardly extending lever 21 connected with the drag link 22 having connection with the steering wheel of the automobile. The lower arm 23 of the frame 19 is connected with the steering cross link (not shown) in a manner well understood in the art.

The inner link of the suspension quadrilateral comprises the vehicle cross beam 10 and the piston element lever arm 24 of a hydraulic shock absorber S mounted on the vehicle chassis, the outer end of the lever 24 being pivoted to the upper arm 15 of the outer suspension link.

The lower link of the suspension quadrilateral is in the form of an integral bar comprising the top wall 25 and a longitudinal downwardly extending strengthening web 26. At its inner end the link terminates in a head 27 received by the end of the clamping frame 12 to be pivoted thereto as by a bolt 28. At its outer end the link has a rearward extension so as to provide spaced arms 29 and 30 for reception of the end of the lower arm 16 of the outer link and to be pivoted thereto as by a bolt 31.

The top wall 25 of the lower link extends below and substantially parallel with the bottom of the spring 13 which terminates short of the outer link arm 16 to be supported at its outer end by the lower link, a bearing pad 32 being provided therefor. This pad may be of metal, or may be of resilient material such as rubber and may be seated in a pocket 33 formed in the lower link. The center line of the pivot connection of the inner end of the lower link with the spring clamping frame 12 is in alignment with the radius or flexure center of the spring 13 so that during vertical movement of the wheel and the suspension quadrilateral there will be practically no relative movement between the outer end of the spring and the link and no wear of the spring on its supporting pad. If there is any relative movement, friction can be eliminated by lubrication. Where the pad is of material such as rubber, it may be impregnated with lubricating material such as graphite. With our improved arrangement, the spring is relieved of strain and wear which would occur if it were pivoted, by shackle or otherwise, to the outer suspension link. Its substantially frictionless support at its outer end solely by the lower quadrilateral link leaves the spring free to supply the proper spring or resiliency characteristics to the suspension quadrilateral. In case of breakage of the spring at any point outwardly of its flexure center, it will be caught and held by the lower link and the suspension quadrilateral will be prevented from collapsing. The inclusion of the shock absorber in the linkage assists the spring in causing the suspension linkage operation to be smooth and shock absorbent.

Describing now the bracing of the linkage quadrilateral against fore and aft displacement, a brace of radius bar 34 is provided for each linkage quadrilateral. The rearward extension on the lower quadrilateral link provides a ledge 35 for receiving the fitting or head at the front end of the radius bar, the head being secured on the ledge as by bolts 37. At their rear ends, the radius bars for the front wheel suspension quadrilaterals are separately anchored to a cross beam 38 on the chassis by a suitable bearing connection. For each radius bar, a bearing fitting 39 is provided and is shown as of U-shape and secured to the cross beam 38. The bearing fitting receives between its legs the bearing head 40 at the inner end of the radius bar, a bearing or pivot bolt 41 extending through the fitting legs and the head. The arrangement is such that the bearing axis or center line of the head 40 is coincident with the axis or center line of the bearing or pivot connection between the inner end of the lower quadrilateral link and the spring clamping frame 12, as clearly shown by line x—x. With this arrangement, the radius bar will hold the suspension quadrilateral against fore and aft displacement, and during vertical movement of the wheel, the lower link of the quadrilateral and the radius bar will swing a unit about the axis line extending through the bearing heads 27 and 40 of the lower link and the radius rod respectively, so that the radius rod will not in anywise interfere with free vertical movement of the wheel and its suspension quadrilateral. By having such separate radius bar for each suspension linkage, the movement of one wheel and its linkage will not interfere with the free movement of the other wheel and its linkage. Should there be any fore and aft displacement of the linkage quadrilateral due to loose bearing or pivot connection, such movement will not be communicated to the spring 13 because of the free end support of the spring, and the spring therefore will not be subjected to fore and aft flexure strain during operation of the vehicle.

We have shown and described a practical and efficient embodiment of the various features of our invention but we do not desire to be limited to the exact construction and arrangement shown and described as changes and modifications may be made without departing from the scope of the invention.

We claim as follows:

In independent wheel suspension for vehicles, the combination with a vehicle chassis, a cantilever spring anchored to the chassis and extending laterally therefrom, a suspension linkage comprising an outer link providing a bearing support for a vehicle wheel, an upper link connecting between the outer link and the chassis, a lower link extending between the lower end of the outer link and said chassis and being below and close to the spring and substantially parallel therewith, said spring terminating short of said outer link, a rubber bearing pad seated in a recess in the lower link forming the sole support for the free outer end of said spring, the center line of the connection of said lower link with the chassis being substantially below the flexure center of the spring whereby upon vertical movement of the linkage and the suspended wheel there will be substantially no movement of the spring end relative to said pad, the top of said lower link being of a width throughout its length to afford a bearing and support for the spring to prevent collapse of said suspension linkage in case of breakage of the spring.

RALPH F. PEO.
SHERWOOD C. BLISS.